United States Patent [19]

Behle et al.

[11] 4,270,729
[45] Jun. 2, 1981

[54] TOP OPERATED TANK CAR CLAPPER VALUE

[75] Inventors: Gunter R. Behle; David P. Hillstead, both of St. Charles, Mo.

[73] Assignee: ACF Industries, Incorporated, New York, N.Y.

[21] Appl. No.: 969,024

[22] Filed: Dec. 13, 1978

[51] Int. Cl.³ .............................................. F16K 27/03
[52] U.S. Cl. ..................................... 251/144; 251/88; 251/264
[58] Field of Search ............... 251/144, 216, 225, 264, 251/84, 86, 88; 137/347, 350

[56] References Cited

U.S. PATENT DOCUMENTS

| Re. 17,022 | 7/1928 | Wilson | 251/264 |
|---|---|---|---|
| 1,556,270 | 10/1925 | Welle | 251/264 X |
| 1,795,833 | 3/1931 | Cakmo | 251/264 |
| 1,863,252 | 6/1932 | Pierce | 251/144 |
| 1,890,247 | 12/1932 | Dieterich | 251/264 X |
| 2,011,314 | 8/1935 | Folmsbee | 251/144 X |
| 2,190,723 | 2/1940 | McBride | 251/144 X |
| 2,257,212 | 9/1941 | Willoughby | 251/144 X |
| 2,479,688 | 8/1949 | Lindgren | 251/86 |
| 2,789,579 | 4/1957 | Kowaski | 251/88 X |

FOREIGN PATENT DOCUMENTS

142803 11/1953 Sweden ....................................... 251/88

*Primary Examiner*—William R. Cline
*Attorney, Agent, or Firm*—Henry W. Cummings

[57] ABSTRACT

A top operated tank car valve assembly includes a rod extending downwardly from the top of the tank and is attached to the valve stem of a lading valve located in the bottom of the tank. The stem engages a threaded valve sleeve provided with a mounting flange which engages a cooperating mounting flange on a valve cage. Fasteners engage the upper surface of the sleeve, and extend through the valve cage and engage threaded openings in a tank car bottom outlet mounting flange. The cage includes a valve seat for a valve closure. The valve seat is formed on the lower, internal surface of the valve cage, and circumferentially spaced openings are formed in the valve cage for lading flow. Laterally spaced projections extend upwardly from the lading valve closure. A valve stem retainer includes a pair of formed retainer members which define a cavity or opening. The retainer engages the lower end of the valve stem with a sufficiently tight fit as to substantially reduce horizontal and angular movement of the stem relative to the stem retainer. Slots formed in the retainer receive the projections from the lading valve closure and fasteners hold the formed retainer members in abutting relation to the closure projections. A valve guide depends from the valve closure a sufficiently short distance as to not extend below the tank mounting flange, and thereby a skid is not required in order to comply with AAR and DOT regulations concerning projections extending below the bottom surface of a railway tank car.

8 Claims, 7 Drawing Figures

TOP OPERATED TANK CAR CLAPPER VALUE

BACKGROUND OF THE INVENTION

In a previous top operated railway tank car lading valve assembly, a rod 10 (FIG. 1) extends to the top of a railway tank car (not shown) and is operated at the top of the tank in a known manner. The rod 10 is attached to a sleeve 12 with a pin 14 in a known manner. The stem is externally threaded at 16 and engages a sleeve 18 which is internally threaded as indicated at 20. The sleeve 18 includes a slot 22 which engages a flange portion 24 of a valve cage 26 with clearance as indicated at 28. In addition, a keeper 30 holds the sleeve 18 in engagement with the cage 26 by means of a horizontally extending pin 32 as shown in FIG. 2.

However, it will be apparent that the clearance 28 allows horizontal and rocking movement to occur between the cage 26 and the sleeve 18. This results in a tendency for the stem 16 and the sleeve 18 to become cocked and thus the threads 16 and 20 become bound and it is not possible to operate the valve from the top.

Fasteners 34 extend through the cage 26 and into a tank car bottom outlet mounting flange indicated at 36. The cage 26 includes a valve seat 38 having an inclined seat surface 40. A valve closure 42 includes a retaining portion 44 having a formed slot 46 which engages the lower end 48 of the valve stem 16 with a considerable amount of clearance indicated at 50. The clearance 50 allows movement of the stem 16 relative to the valve closure 42. This clearance also contributes to the likelihood that the stem will become cocked relative to the closure 42 and thus make the valve inoperable from the top of the tank.

The valve closure 42 further includes a slot 52 into which is placed a seal 54. Some sticky ladings tend to pull seat 54 out of slot 52. A depending valve guide 56 is held in place with a threaded pin 58 which threadably engages the valve as indicated at 60 and is held in place with a nut 62. The guide 56 also maintains the seal 54 in place.

As is conventional, the outlet chamber 70 is attached to flange 36 with fasteners 71. A tongue 72 engages a slot 73 containing a seal 74. The outlet chamber includes a hollow lading discharge portion 75 which is closed by a cap 76 which includes a removable plug 77. Cap 76 is adapted to receive a suitable chain 78 to prevent the loss of the cap as is known in the art. Breakage groove 79 may also be provided between the cap and the bottom of the hollow chamber 75.

SUMMARY OF THE INVENTION

In accordance with the present invention, a top operated tank car valve assembly includes a rod extending downwardly from the top of the tank and is attached to a valve stem of a lading valve located in the bottom of the tank. The stem engages a threaded valve sleeve provided with a mounting flange which engages a cooperating mounting flange on a valve cage. Fasteners engage the upper surface of the sleeve, and extend through the valve cage and engage threaded openings in a tank car bottom outlet mounting flange. The tendency for the sleeve and the rod to become cocked relative to the valve cage is thus reduced. The cage includes a valve seat for a valve closure, formed on the lower, internal surface of the valve cage, and circumferentially spaced openings are formed in the valve cage for lading flow. Laterally spaced projections extend upwardly from the lading valve closure. A valve stem retainer includes a pair of formed retainer members which define a cavity or opening. The retainer engages the lower end of the valve stem with a sufficiently tight fit that substantially reduces horizontal and angular movement of the stem relative to the stem retainer. Slots formed in the retainer members receive the projections from the lading valve closure and fasteners hold the formed retainer members in abutting relation to the closure projections.

A valve guide depends from the valve closure a sufficiently short distance as to not extend below the tank mounting flange, and thereby a skid is not required in order to comply with AAR and DOT regulations concerning projections extending below the bottom surface of a railway tank car.

However, the depending guide 56 is disadvantageous because recent AAR and DOT regulations concerning railway tank cars require that projections extending below the tank bottom in excess of one (1) inch must be provided with a skid to protect the depending portion against impact. The skid adds weight and expense to the car.

THE DRAWINGS

DESCRIPTION OF PREFERRED EMBODIMENTS

Figure 1:
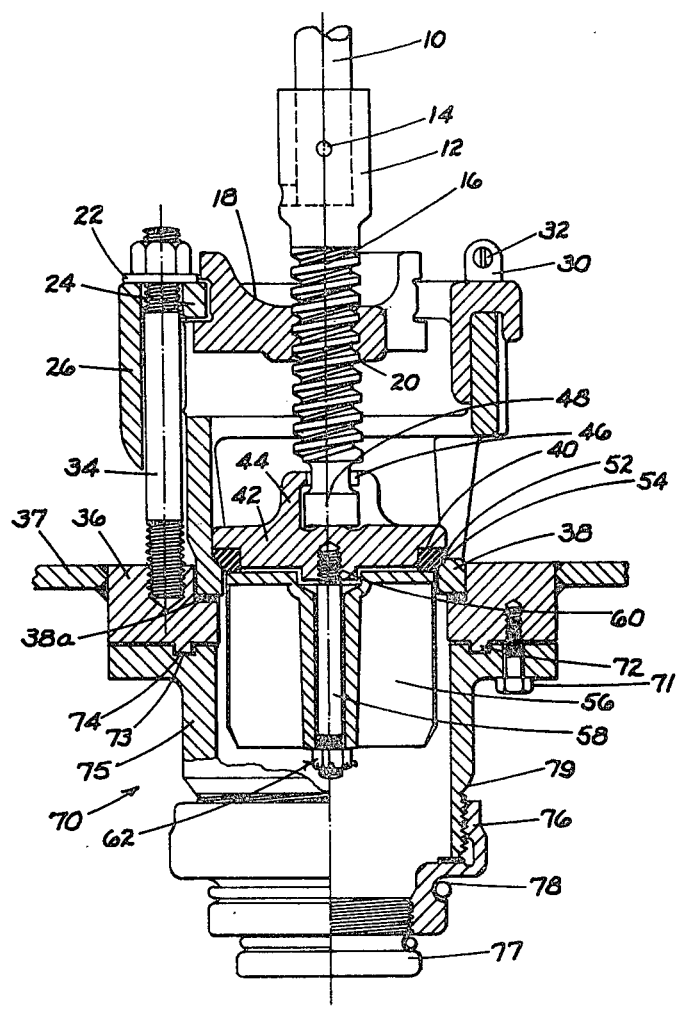
FIG. 1 is a vertical sectional view illustrating a prior art tank car valve assembly.

The bottom outlet valve assembly of the present invention is indicated generally at 80. This assembly includes a rod 82 extending to the top of the tank. A universal joint 84 is provided in the rod 84 as disclosed in co-pending application Ser. No. 908,184 filed May 22, 1978, assigned to the same assignee as the present application, and hereby incorporated by this reference.

Briefly, the universal joint includes a first pivoting part 86 connected to rod 82, and a second pivoting part 88 connected by a pin 90. Second pivoting part 88 is attached to a shaft portion 92. Shaft 92 extends within a hollow portion of valve stem 92 and is attached to a valve stem 94 by means of a pin 96. Stem 96 is reduced in cross section at 97 and is externally threaded at 98. Threaded portion 98 passes through a sleeve indicated generally at 100. Sleeve 100 includes a flange portion 102 and a slot 104 which engages a flange portion 106 of a valve cage 108. Flange portion 106 of the valve cage and flange portion 102 of the sleeve are preferably machined surfaces with a snug fit, thereby tending to reduce, to a great extent, relative movement between the cage 108 and the sleeve 100.

Sleeve 100 is internally threaded as indicated at 110 to engage stem threads 98. Fasteners 112 engage the upper surface 114 of the sleeve 100 and extend downwardly through cage 108 into threaded openings 116 in a tank car mounting flange 118. Valve cage 108 includes a body portion 120 having a horizontal rib 121 which defines a stop 123 and includes a plurality of circumferential openings 122 for lading to pass through. Body portion 120 further includes a valve seat 124 including an inclined valve seat portion 126.

Figure 4:
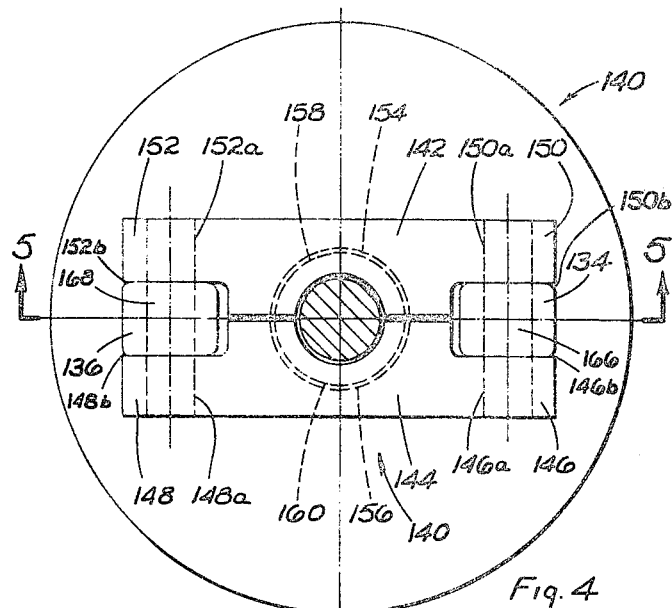
FIG. 4 is a detailed plan view of the retainer and stem assembly utilized in the present invention.
Figure 5:
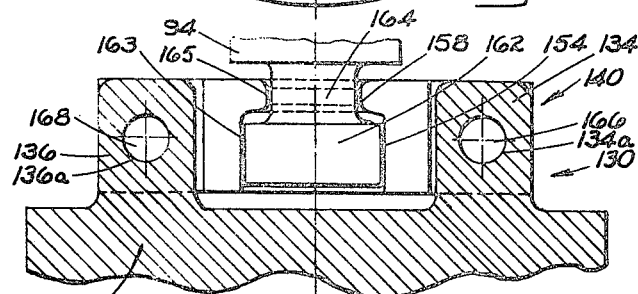
FIG. 5 is a sectional view looking in the direction of the arrows along the line 5—5 in FIG. 4.
Figure 2:
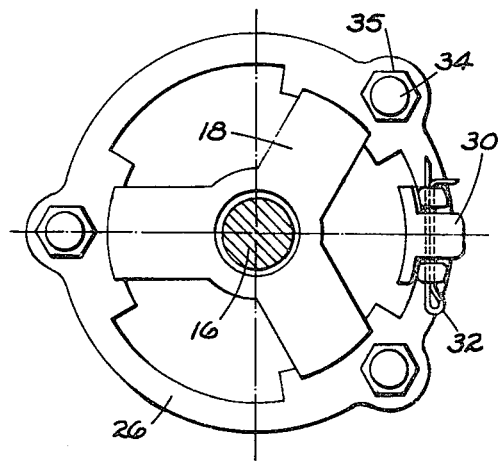
FIG. 2 is a view looking in the direction of the arrows along the line 2—2 in FIG. 1.
Figure 6:
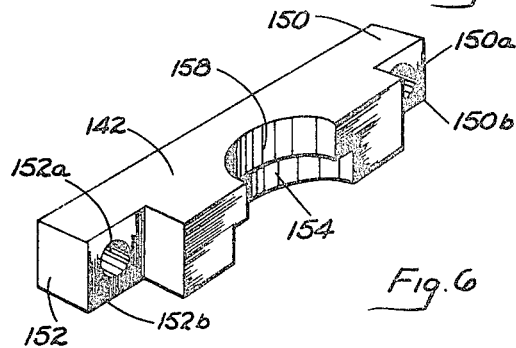
FIG. 6 is an enlarged perspective view of one of the retainer members illustrated in FIGS. 4 and 5.

A lading valve closure indicated generally at 130 includes a body portion 131 and an inclined portion 132 adapted to engage inclined seat portion 126 in closed position. Valve closure 130 further includes a pair of laterally spaced, vertically extending projections 134 and 136 having respective openings therein 134a and 136a. A stem retainer indicated generally at 140 includes a pair of formed members 142 and 144. Each of the formed members 142 and 144 include respective end mounting portions 146, 148, and 150, 152. The mounting portions are slotted and contain openings 146a, 148a, 150a, and 152a adapted to receive a mounting fastener, and are slotted as indicated at 146b, 148b, 150b and 152b to receive projections 134 and 136. Each of the four members 142 and 144 include respective lower semi-circular machined surfaces 154 and 156 and upper machined surfaces 158 and 160 (FIGS. 4–6). As shown in FIG. 5, the lower machined surface 154 engages a lower hub 162 located on stem 92, with clearance indicated at 163. Upper semi-circular surface 158 is dimensioned to be spaced from a portion of reduced diameter 164 located on stem 94 to provide clearance 165. The amount of clearance provided at 163 and 165 is sufficiently small as to tend to prevent stem 94 to become cocked relative to valve 130. Furthermore, the amount of clearance 163 and 165 determines the extent to which valve closure 130 will rotate with stem 94. The clearance is not usually sufficiently great to prevent the valve from rotating with the valve stem as the valve moves between open and closed positions. If the clearance exceeds about ten (10) thousandths, when the valve closure engages the valve seat, the closure stops rotating. If the clearance is less than about ten (10) thousandths, the valve closure rotates with the stem as the valve assumes the seated position. Horizontally extending pins 166 and 168 extend through projections 134 and 136 and are held in place with suitable nuts and washers 170 and 172.

Valve closure 130 includes a depending guide 176 of circular cross section, and having an inward taper as indicated at 178. Guide 176 does not extend downwardly below the lower surface 179 of universal flange 118. Since the valve guide 176 does not extend below the universal mounting flange more than one (1) inch, a protective skid is not required in order to comply with AAR and DOT regulations concerning projections extending below the tank bottom in excess of one (1) inch.

Figure 7:
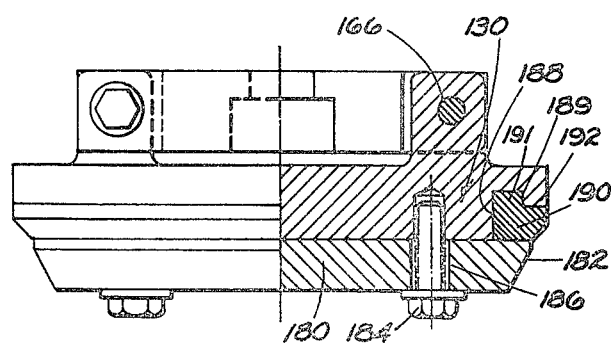
FIG. 7 is an enlarged detailed view illustrating an alternative valve closure including a seal and a depending guide.
Figure 3:
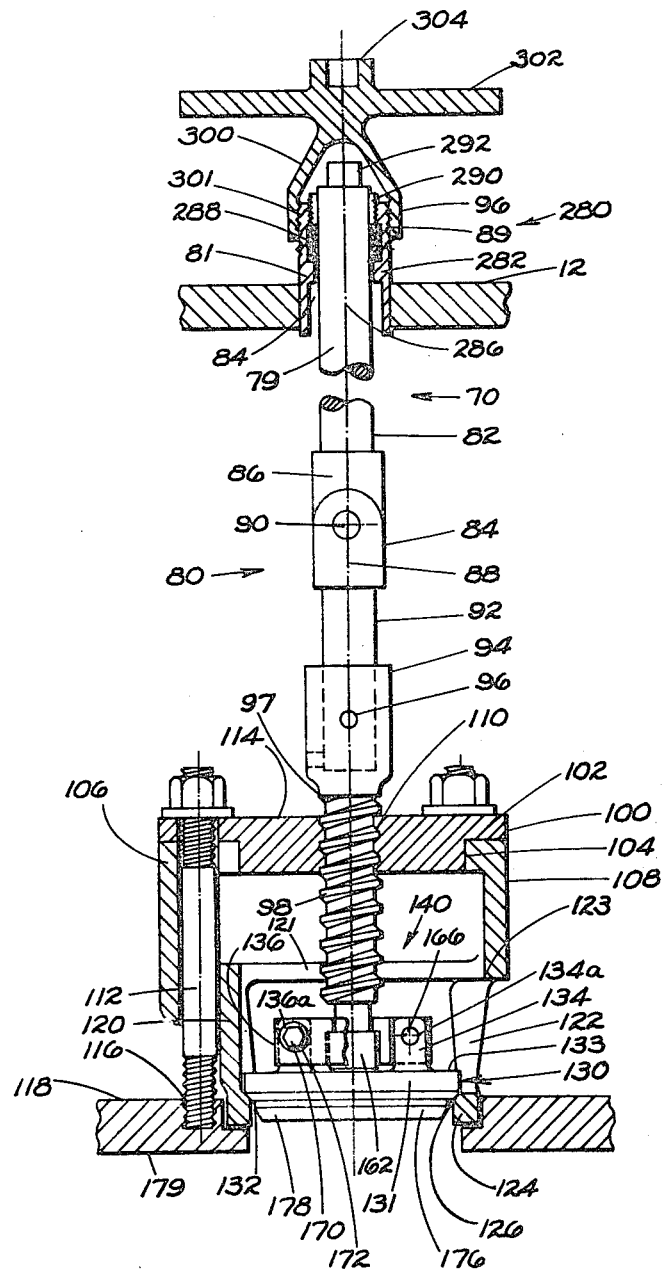
FIG. 3 is a vertical sectional view of the top operated tank car valve assembly of the present invention.

While retainer 176 may be formed integral with the valve closure 130, as indicated in FIG. 3, in a preferred alternate shown in FIG. 7, a retainer 180 is formed as a separate member having an inclined surface 182. Fasteners 184 extend through openings 186 in the retainer and into the valve body 131. A slot 188 is preferably provided in the valve body and a gasket 190 is inserted therein. The valve guide 180 holds the gasket in place. Slot 188 includes an upper portion 189 which receives a projection 191 from seal 190. Flange portion 192 thus holds projection 191 and seal 190 in place, and prevents its removal in the presence of sticky ladings which have a tendency to pull seal 190 out of slot 188. Thus, this seal anchoring arrangement is improved over the arrangement holding seal 54 in FIG. 1.

At the top of the tank, rod 82 extends into a top operator 280 including an operator body 282 through which extends the end 286 of rod 82 of circular cross section. End 286 extends through a packing 288 and a packing nut 290, and has an end connection portion 292. An operating handle 300 engages threads 301 on the operator body 282. The handle 300 may be removed and connection portion 304 and gripping portion 302 used to rotate rod 82 to move valve closure 130 between open and closed positions.

In the operation of the assembly of the present invention, by removing handle 302 from operator body portion 282, rod 82 is rotated from the top of the car and engages connection portions 304 and 292. Universal joint 84 tends to reduce misalignment of the rod between the top of the car and the bottom of the car as described in greater detail in said Ser. No. 908,184. Rotation of rod 82 in one direction causes valve assembly 130 to move vertically between open and closed positions as threads 98 on the stem engage threads 110 in the sleeve. The sleeve abutting flange portion 102 and valve cage flange portion 104 prevent significant movement of the sleeve relative to the cage as the valve is moved between open and closed positions. Abutting surfaces 146, 150 against projections 134, and surfaces 148, 152 against projection 136 prevents cocking or tilting of the valve assembly relative to the stem as the valve moves between open and closed positions. The amount of clearance 163 and 165 determines whether or not the valve closure and retainer rotate with the valve stem as the valve closure seats or remains fixed.

In open position, the upper surface 133 of the valve stem engages stop surface 123 provided on the valve cage. Rotation of the rod 82 in the opposite direction will return the valve to the closed and seated position shown in FIG. 3.

What is claimed is:

1. A top operated tank car lading valve assembly including a railway tank car; a top rod extending to the top of the tank; said rod attached to a valve stem in the lower portion of the tank; said stem being externally threaded and engaging a horizontally extending internally threaded valve sleeve; said sleeve engaging a generally vertically extending valve cage and vertically extending fasteners holding said sleeve in engagement with said cage; said cage extending above a tank car bottom outlet mounting flange; said flange having a flange opening therein; said flange located in an opening in the tank bottom; said cage having vertically extending legs and circumferentially spaced openings between said legs for lading flow; a valve seat for a vertically movable valve closure located within said cage; said valve closure movable between open and closed positions relative to said seat; said closure having at least a pair of laterally spaced vertical projections extending upwardly into said cage; a pair of formed stem retainer members each having a pair of slots at opposite ends to receive one of said projections, and a semi-circular center slot to receive said valve stem; fastening means extending through said retaining members and said projections to hold said projections in place within said retainer members; said semi-circular slots defining a cavity to receive and engage a cylindrical slightly smaller lower end portion of said stem; said fastening means further holding said stem retainers in abutting relation to said projections with a fit sufficiently tight that substantially eliminates horizontal and angular movement of the stem relative to the valve closure.

2. A top operated tank car valve according to claim 1 wherein a seal slot is formed in said valve closure and a seal is located in said seal slot held in place with a seal retainer located below said valve closure.

3. A top operated tank car valve according to claim 2 wherein said seal retainer is tapered and forms a guide for movement of said valve closure between open and closed positions.

4. A top operated tank car valve according to claim 2 wherein said seal slot includes a seal slot upper portion extending into said valve closure; and wherein said seal includes a projection extending into said seal slot upper portion.

5. A top operated tank car valve according to claim 1 wherein the clearance between said valve stem and said stem retainer members do not exceed about ten (10) thousandths of an inch and wherein said closure rotates with said valve stem as said closure assumes the closed position.

6. A top operated tank car valve according to claim 1 wherein the closure between said valve stem and said stem retainer exceeds ten (10) thousandths of an inch and wherein said closure ceases rotating as soon as said closure engages said valve seat.

7. A top operated tank car valve according to claim 1 wherein an open position stop is formed on said cage and wherein the upper surface of said valve closure engages said open position stop in open position.

8. A top operated tank car lading valve assembly according to claim 1 including a valve guide depending from the valve closure a sufficiently short distance as to not extend below said bottom outlet mounting flange; said mounting flange extending between the lower surface of said tank bottom not in excess of one (1) inch.

* * * * *

UNITED STATES PATENT AND TRADEMARK OFFICE
CERTIFICATE OF CORRECTION

PATENT NO. : 4,270,729
DATED : June 2, 1981
INVENTOR(S) : Gunter R. Behle and David P. Hillstead It is certified that error appears in the above-identified patent and that said Letters Patent are hereby corrected as shown below:

On the face of the patent, in the title, the word "VALUE" should be --VALVE--.

In column 1, line 1, "VALUE" should be --VALVE--

In column 4, line 3, after "54" insert --in groove 52--.

Signed and Sealed this

Third Day of November 1981

[SEAL]

Attest:

GERALD J. MOSSINGHOFF

Attesting Officer     Commissioner of Patents and Trademarks